United States Patent
Manadhata et al.

(10) Patent No.: US 11,245,720 B2
(45) Date of Patent: Feb. 8, 2022

(54) DETERMINING WHETHER DOMAIN IS BENIGN OR MALICIOUS

(71) Applicant: ENTIT Software LLC, Sanford, NC (US)

(72) Inventors: Pratyusa K. Manadhata, Piscataway, NJ (US); Martin Arlitt, Calgary (CA)

(73) Assignee: MICRO FOCUS LLC, Santa Clara, CA (US)

( * ) Notice: Subject to any disclaimer, the term of this patent is extended or adjusted under 35 U.S.C. 154(b) by 259 days.

(21) Appl. No.: 16/433,151

(22) Filed: Jun. 6, 2019

(65) Prior Publication Data
US 2020/0389468 A1   Dec. 10, 2020

(51) Int. Cl.
H04L 29/06   (2006.01)

(52) U.S. Cl.
CPC .......... H04L 63/145 (2013.01); H04L 63/10 (2013.01); H04L 63/101 (2013.01)

(58) Field of Classification Search
CPC ............ H04L 63/1425; H04L 61/1511; H04L 61/3025; H04L 63/1466
See application file for complete search history.

(56) References Cited

U.S. PATENT DOCUMENTS

| | | |
|---|---|---|
| 8,260,914 B1 | 9/2012 | Ranjan |
| 9,245,121 B1 | 1/2016 | Luo et al. |
| 9,479,524 B1 | 10/2016 | Hagen |
| 9,516,039 B1 | 12/2016 | Yen et al. |
| 9,516,058 B2 | 12/2016 | Antonakakis et al. |
| 9,602,525 B2 | 3/2017 | Qian et al. |
| 9,686,291 B2 | 6/2017 | Antonakakis et al. |
| 9,756,063 B1 | 9/2017 | Chung |
| 9,781,139 B2 | 10/2017 | Sofka |
| 9,979,748 B2 | 5/2018 | O'connor |

(Continued)

FOREIGN PATENT DOCUMENTS

| | | |
|---|---|---|
| CN | 105024969 A | 11/2015 |
| CN | 106911717 A | 6/2017 |

(Continued)

OTHER PUBLICATIONS

Tom Fawcett, "An Introduction To ROC Analysis", Science Direct, Dec. 19, 2005, (14 pages).

(Continued)

*Primary Examiner* — Jason K Gee

(57) ABSTRACT

For each of a number of naming deviation types, the number of deviations within a domain name of a domain is determined. Each naming deviation type is a different type of deviation from domain name naming rules. For each naming deviation type for which the number of deviations is non-zero, first benign and malicious probabilities that benign and malicious domains, respectively, have the naming deviation type are estimated. Second benign and malicious probabilities that any given domain is respectively benign and malicious are estimated. Probabilities that the domain is benign and malicious are estimated based on the number of deviations for each naming deviation type and based on the estimated first and second benign and malicious probabilities. Whether the domain is benign or malicious is determined based on the estimated probabilities that the domain is benign and malicious.

20 Claims, 5 Drawing Sheets

(56) References Cited

U.S. PATENT DOCUMENTS

| | | | |
|---|---|---|---|
| 10,075,458 | B2 | 9/2018 | Baughman et al. |
| 10,498,753 | B1 | 12/2019 | Pope |
| 2006/0021031 | A1* | 1/2006 | Leahy ................ H04L 63/1483 726/22 |
| 2012/0054860 | A1 | 3/2012 | Wyschogrod |
| 2014/0082726 | A1 | 3/2014 | Dreller |
| 2014/0230054 | A1 | 8/2014 | Dinerstein |
| 2015/0341379 | A1 | 11/2015 | Lefebvre |
| 2016/0065534 | A1 | 3/2016 | Liu et al. |
| 2016/0255107 | A1 | 9/2016 | Qian |
| 2016/0294852 | A1 | 10/2016 | Hagen |
| 2016/0337391 | A1 | 11/2016 | McKinney |
| 2016/0352679 | A1 | 12/2016 | Josiah et al. |
| 2016/0352772 | A1* | 12/2016 | O'Connor .......... H04L 63/1483 |
| 2017/0155667 | A1 | 6/2017 | Sobel |
| 2017/0295196 | A1 | 10/2017 | Arnell et al. |
| 2017/0324757 | A1 | 11/2017 | Al-Shaer |
| 2017/0346855 | A1 | 11/2017 | Reddy |
| 2018/0124020 | A1 | 5/2018 | Rodriguez |
| 2018/0176232 | A1* | 6/2018 | Rodriguez ............ H04L 43/062 |
| 2018/0234434 | A1 | 8/2018 | Viljoen |
| 2018/0343272 | A1 | 11/2018 | Khalil et al. |
| 2019/0052650 | A1 | 2/2019 | Hu |
| 2019/0068555 | A1 | 2/2019 | Tsirkin |
| 2019/0141067 | A1 | 5/2019 | Rodriguez et al. |
| 2020/0059451 | A1* | 2/2020 | Huang ...................... G06N 3/02 |

FOREIGN PATENT DOCUMENTS

| | | |
|---|---|---|
| CN | 109450842 A | 3/2019 |
| WO | WO-2017030569 A1 | 2/2017 |

OTHER PUBLICATIONS

Ahluwalia et al., Detecting Broad Length Algorithmically Generated Domains, Oct. 11, 2017, https://link.springer.com/chapter/10.1007/978-3-319-69155-8_2 (16 pages).

Anonymous, "Character level based detection of DGA Domain names", ICLR 2018, 11 pages.

Antonakakis et al., From Throw-Away Traffic to Bots: Detecting the Rise of DGA-Based Malware, 2012 (16 pages).

Ashraf Abu-Alia, Detecting Domain Flux Botnet using Machine Learning Techniques, Feb. 2015 http://qspace.qu.edu.qa/bitstream/handle/10576/3279/Abu-Alia%2C%20Ashraf.pdf?sequence=4&isAllowed=y (104 pages).

Darling et al., A Lexical Approach for Classifying Malicious URLs, 2015, http://ieeexplore.ieee.org/abstract/document/7237040/ (8 pages).

Feng Zeng, et al., "Classification for DGA-based malicious domain names with deep learning architectures", International Journal of Intelligent Information System. vol. 6, No. 6, 2017, pp. 67-71.

Fu et al., Abstract Only, Stealthy Domain Generation Algorithms, Feb. 13, 2017 http://ieeexplore.ieee.org/document/7852496/ (5 pages).

HP ArcSight DNS Malware Analytics, Datasheet, Aug. 2015 (2 pages).

Manadhata et al., U.S. Appl. No. 15/884,978 entitled Indicating Malware Generated Domain Names Using N-Grams filed Jan. 31, 2018 (30 pages).

Manadhata et al., U.S. Appl. No. 15/884,983 entitled Indicating Malware Generated Domain Names Using Digits filed Jan. 31, 2018 (30 pages).

Manadhata et al., U.S. Appl. No. 15/884,988 entitled Malware-Infected Device Identifications filed Jan. 31, 2018 (38 pages).

Martin Boasson Nordby, Security Incident Detection with Passive DNS Logs, May 2, 2014 https://www.duo.uio.no/bitstream/handle/10852/42055/Nordby-Master.pdf?sequence=29 (84 pages).

Mowbray et al., Finding Domain-Generation Algorithms by Looking at Length Distributions, 2014, https://pdfs.semanticscholar.org/bc12/34d57c2bfae6bcc6a8f1f1743ba42b8317ed.pdf (6 pages).

Osint Feeds From Bambenek Consulting, Master Feeds downloaded Jan. 3, 2018, http://osint.bambenekconsulting.com/feeds/ (3 pages).

Plohmann et al., A Comprehensive Measurement Study of Domain Generating Malware, Proceedings of the 25th USENIX Security Symposium, Aug. 2016 (17 pages).

Quan Le, et al., "Deep learning at the shallow end—Malware Classification for non-Domain Experts", Digital Investigation, vol. 26, Supplement, Jul. 2018, pp. S118-S126.

Schiavoni et al., Phoenix: DGA-based Botnet Tracking and Intelligence, 2014 (20 pages).

Wang et al., Breaking Bad: Detecting Malicious Domains Using Word Segmentation, Jun. 2015 https://arxiv.org/pdf/1506.04111.pdf (7 pages).

Wikipedia, Botnet last edited Dec. 22, 2017 (8 pages).

Wikipedia, Edit distance last edited Dec. 29, 2017 (5 pages).

Wikipedia, Levenshtein distance last edited Jan. 6, 2018 (8 pages).

Woodbridge et al., Predicting Domain Generation Algorithms with Long Short-Term Memory Networks, Nov. 2, 2016, http://www.covert.io/research-papers/deep-learning-security/Predicting%20Domain%20Generation%20Algorithms%20with%20Long%20Short-Term%20Memory%20Networks.pdf (13 pages).

Yadav et al., Detecting Algorithmically Generated Malicious Domain Names, Nov. 1-3, 2010, http://citeseerx.ist.psu.edu/viewdoc/download?doi=10.1.1.221.1167&rep=rep1&type=pdf (14 pages).

Yanchen Qiao, et al., "DGA Domain name classification method based on long short term memory with attention mechanism", Applied Sciences, MDPI, Oct. 9, 2019, 14 pages.

Manadhata et al., U.S. Appl. No. 16/709,637 entitled Classifying Domain Names Based on Character Embedding and Deep Learning, filed Dec. 10, 2019, (48 pages).

Koh et al., "Inline Detection of Domain Generation Algorithms with Context-Sensitive Word Embeddings", Optfit LLC, Denver, Colorado; Georgia Institute of Technology, Atlanta, Georgia, Nov. 21, 2018, https://www.researchgate.net/publication/330632552_Inline_Detection_of_Domain_Generation_Algorithms_with_Context-Sensitive_Word_Embeddings.

Shi et al., "Malicious Domain Name Detection Based on Extreme Machine Learning", School of Electronic Information and Electrical Engineering, Shanghai Jiao Tong University, People's Republic of China, Jul. 3, 2017, https://link.springer.com/article/10.1007/s11063-017-9666-7.

Zhao et al., "Malicious Domain Names Detection Algorithm Based on N-Gram", School of Computer and Communication, Lanzhou University of Technology, China; Department of Mathematics and Computer Science, Fort Valley State University, USA, Nov. 21, 2018, https://www.hindawi.com/journals/jcnc/2019/4612474/.

Zhauniarovich et al. , "A Survey on Malicious Domains Detection through DNS Data Analysis", ACM Computing Surveys, vol. 51, Issue 4, Sep. 2018.

Agyepong et al., "Detection of Algorithmically-Generated Malicious Domain Using Frequency Analysis", International Journal of Computer Science & Information Technology (IJCSIT) vol. 10, No. 3, Jun. 2018.

* cited by examiner

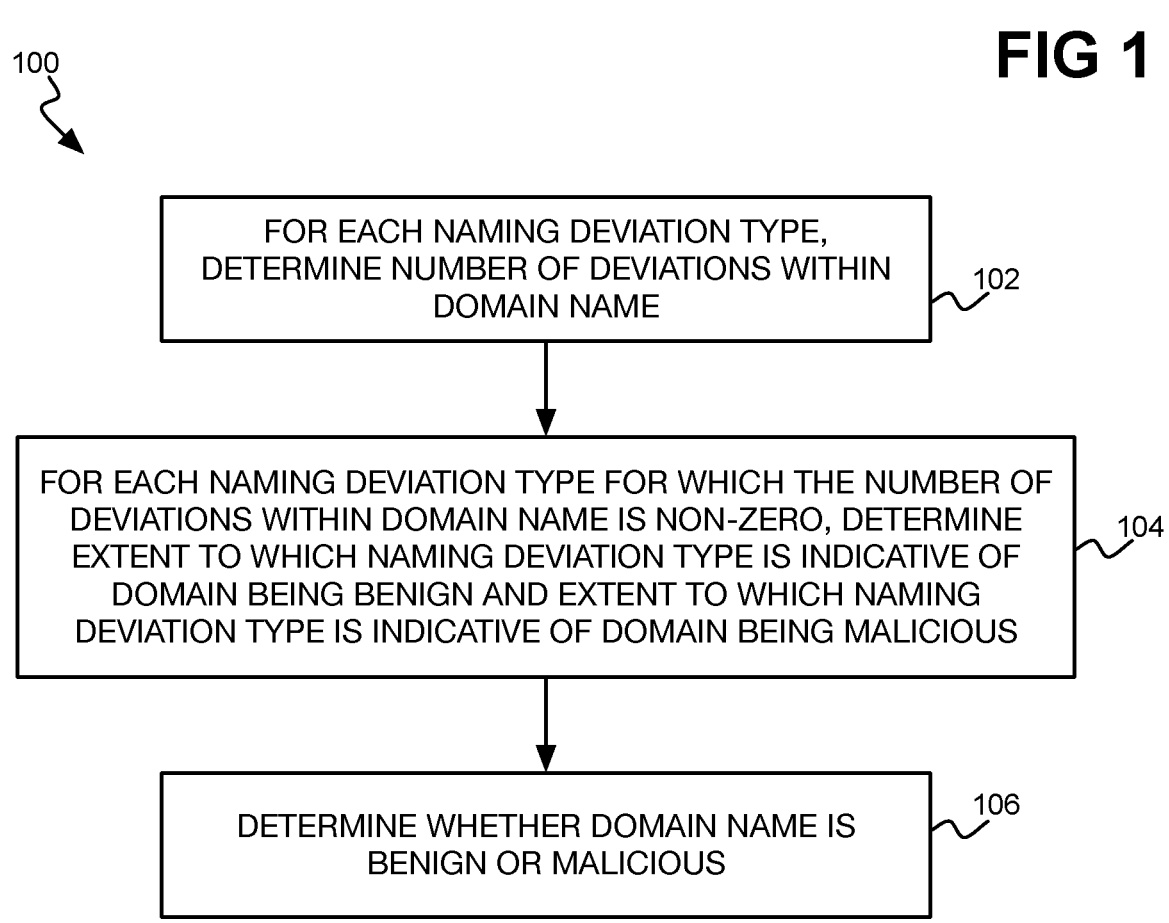

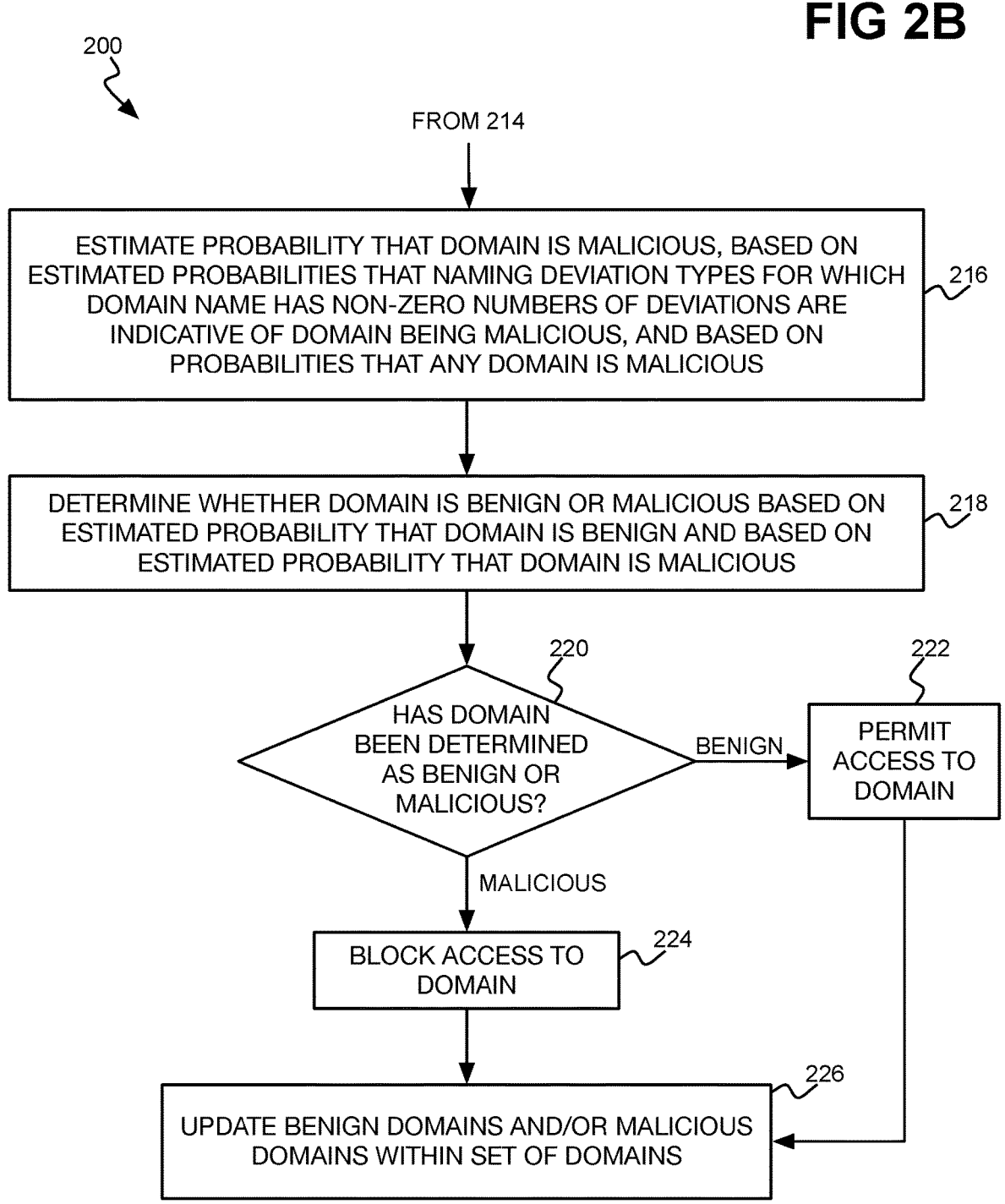

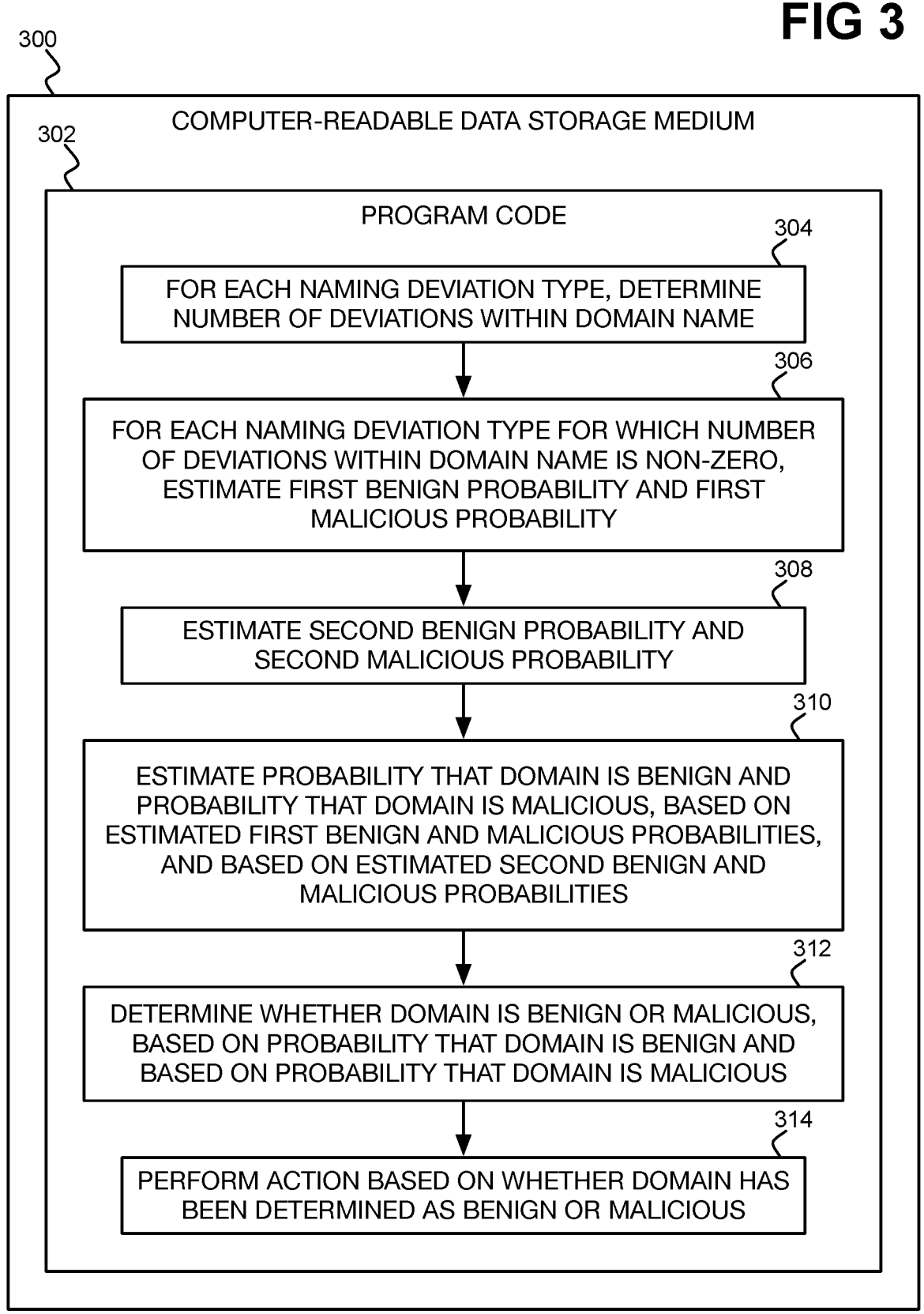

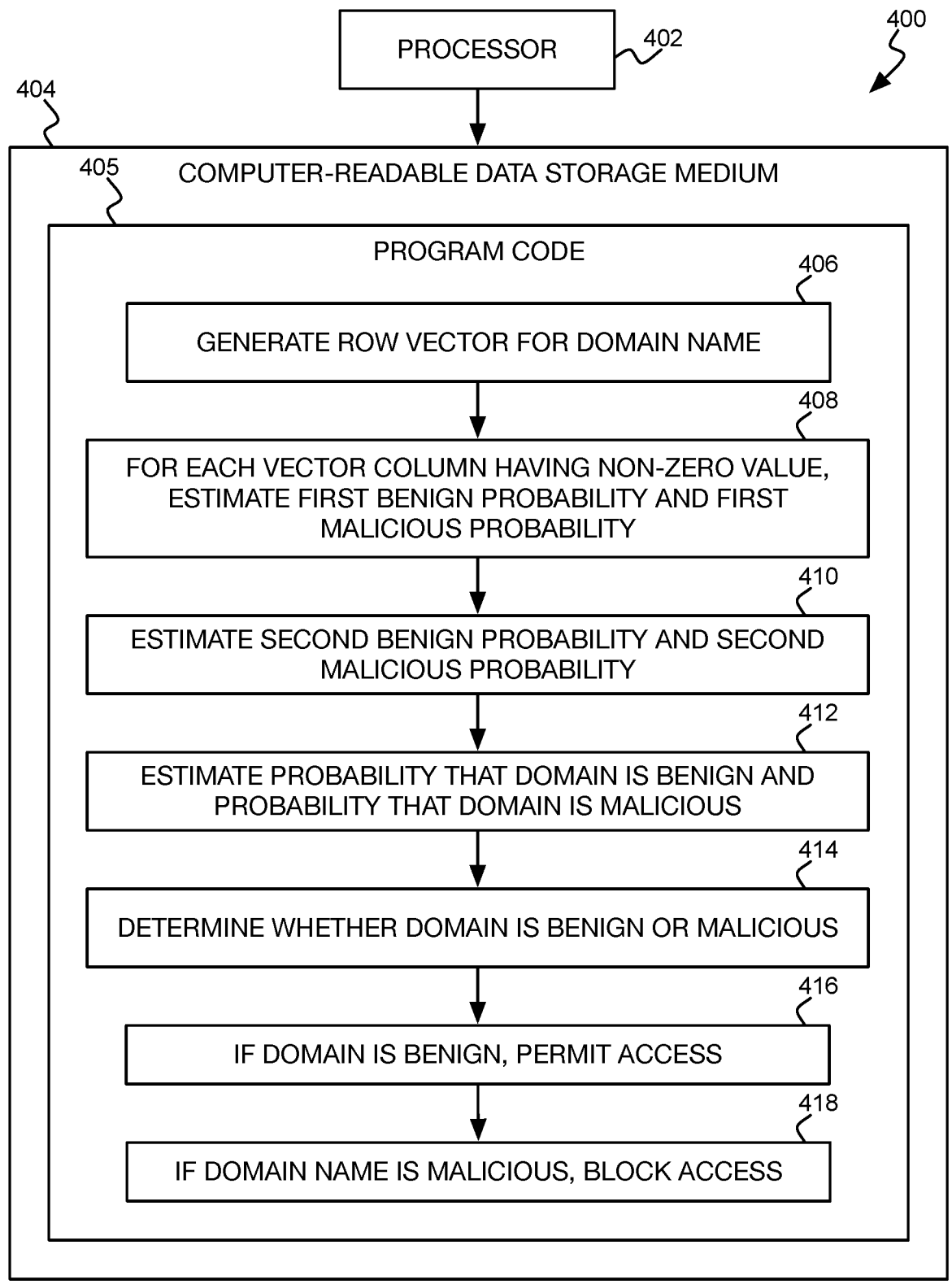

DETERMINING WHETHER DOMAIN IS BENIGN OR MALICIOUS

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to permitting a computing device to reach nearly any other device around the world is the computing device's susceptibility to unwittingly communicate with malicious devices in ways unimaginable decades ago.

BRIEF DESCRIPTION OF THE DRAWINGS

FIG. 1 is a flowchart of an example method for determining whether a domain is benign or malicious.

FIGS. 2A and 2B are flowcharts of an example method for determining whether a domain is benign or malicious, and is consistent with the method of FIG. 1.

FIG. 3 is a diagram of an example computer-readable data storage medium.

FIG. 4 is a diagram of an example computing device.

DETAILED DESCRIPTION

Figure 2A:
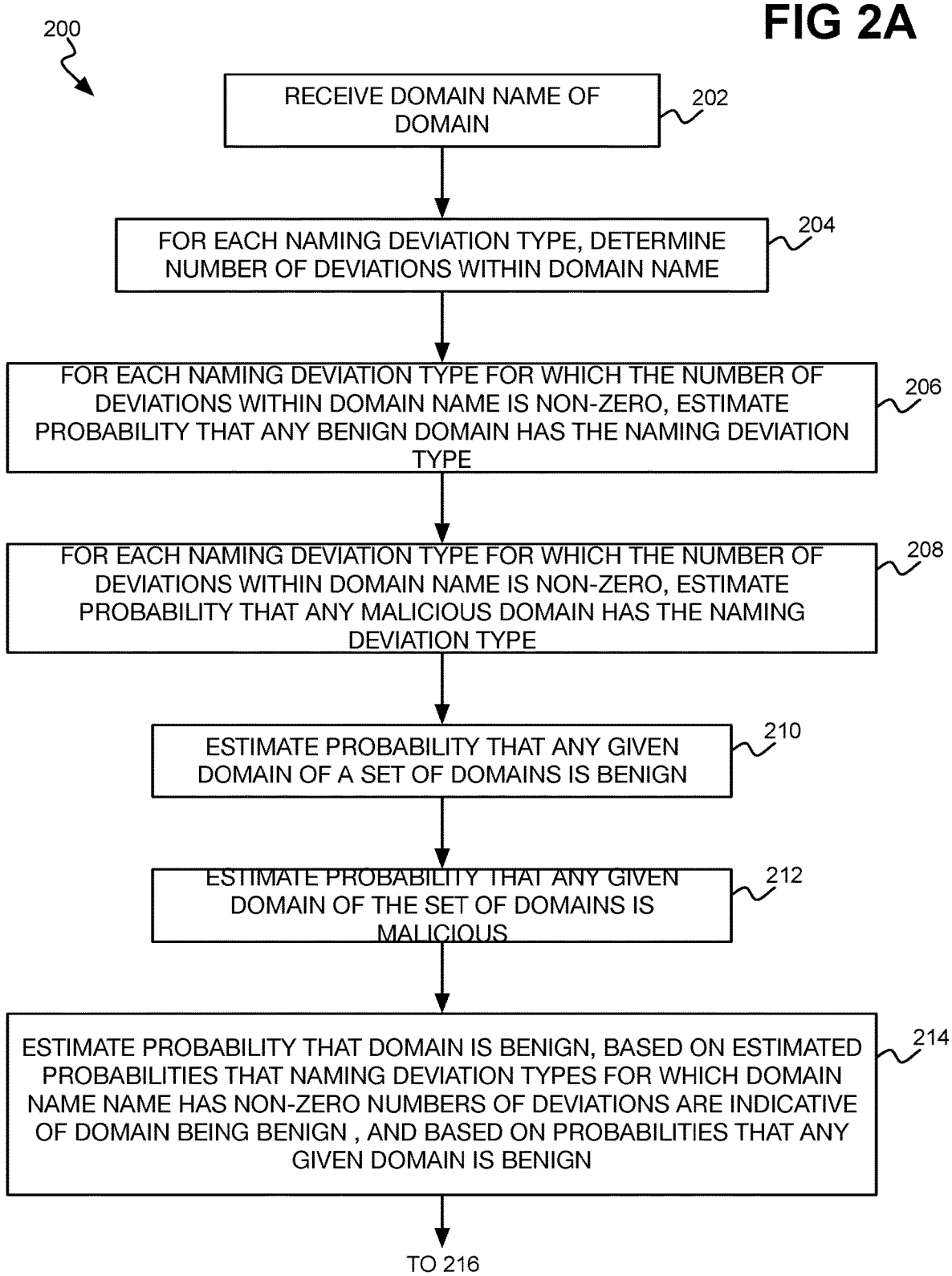

As noted in the background, a large percentage of the world's computing devices can communicate with one another over the Internet, which while generally advantageous renders the computing devices susceptible to unwittingly communicating with malicious devices. For instance, a client computing device, such as a desktop, laptop, or notebook computer, or a smartphone or tablet computing device, may via a web browser, app, or other software access server and other computing devices over the Internet to access web applications, web sites, web services, and so on, which are hosted by the servers. However, nefarious parties may be able to redirect communication from such clients to their own malicious servers and other computing devices, compromising the security and confidentiality of the clients or their users.

In computer networking, a hostname is a name assigned to a device connected to a computer network and that is used to identify the device in various forms of electronic communication, such as the World Wide Web (the "web"). Internet hostnames are specifically domain names assigned to host computers. An Internet hostname can have appended thereto the name of a domain name system (DNS) domain, separated from a domain-specific label by a period, or "dot." A completely specified domain name includes a label of a top-level domain of the Internet, and can include one or more labels of local hosts separated from the top-level domain label and from one another by dots. Such a completely specified domain name is referred to as a fully qualified domain name (FQDN), and if all necessary labels are not included, is referred to as a relative domain name or a partially qualified domain name (PQDN).

For example, "abc.123.domain.com" is a hostname assigned to a device that can be an FQDN, or a PQDN if, for instance, one or more other labels are needed (such as prefatory to "abc," and separated from one another and from "abc" by dots) to more particularly specify a particular host device associated with the hostname. In this example, "domain.com" is the top-level domain name (made up of two labels, "domain" and "com"), whereas "abc" and "123" are local domain labels. A single host device can have several hostnames.

When accessing a web service or application, or a web site, hosted by a host on the Internet or other network, a client computing device thus may resolve the hostname of the host to the host's actual networking address, like an Internet Protocol (IP) address, via a DNS resolver. A single web page, for instance, may specify content hosted by multiple hosts, each with its own hostname. If a host has been compromised, or if the user has incorrectly entered the universal resource locator (URL) address including a host name of the intended host in the browser software of the client computing device, the client may reach a malicious host device instead of the intended (presumably benign) host, with deleterious results. For instance, the malicious host may infect the unsuspecting client with malware, or otherwise compromise the client. For example, the malicious host may present a web page seemingly identical to the intended benign host to collect confidential information subsequently entered by the user, or pass through client access to the intended domain while also intercepting all information passed between the client and the intended host.

The terminology "domain name" is used herein in a more general sense than and is inclusive of the terminology "hostname." Thus, whereas a hostname identifies a particular host, a domain name may or may not identify a particular host. That is, the domain with which a domain name is associated may be a particular host, or a collection of one or more hosts—or no hosts. A domain can be benign or malicious, just as a host can be benign or malicious.

Techniques described herein provide for ways to determine whether a domain is benign or malicious based on its domain name. The techniques leverage the fact that while there are nominal rules governing naming of domain names, in actuality DNS resolvers and other networking and computing equipment and devices do not enforce these rules. More specifically, the techniques leverage the novel insight of the inventors that malicious domains may have domain names deviating from prescribed domain naming rules in ways that are different from how the domain names of benign domains deviate from these same rules. As such, when presented with the domain name of a domain, the described techniques can determine whether the domain is likely benign or malicious based on whether the deviations of its domain name from the prescribed domain naming rules in ways more akin to those of domain names of benign domains or in ways more like those of domain names of malicious domains.

FIG. 1 shows an example method 100 for determining whether a domain is benign or malicious based on its domain name. A computing device can perform the method 100. For example, the computing device may be a server or other type of computing device with which a client computing device communicates in order to reach the domain on a network like the Internet. The server may be providing a DNS resolver or HyperText Transfer Protocol (HTTP) proxy service, for instance. The client may present to the computing device performing the method 100 the domain name of the domain that the client intends to access, with the computing device then determining whether the domain name is indicative of a benign domain or a malicious domain.

As another example, the client may not directly communicate with the computing device that performs the method 100. In this case, DNS queries or HTTP requests may be collected and sent to the computing device, which can then determine whether the domain name of each such query or request is benign or malicious. The resulting information can be subsequently used in a variety of different ways. It is noted that, in any case, the method 100 may be implemented as program code stored on a non-transitory computer-readable data storage medium and executable by a computing device.

The computing device determines the number of deviations within the presented domain name for each of a number of naming deviation types from prescribed domain name naming rules (102). For example, the DNS protocol specifies a set of rules governing the names associated to domains accessible over the web. A domain name includes a set of labels separated by dots. Each label is a sequence of alphanumeric or other characters. The rules specify that the maximum length of a domain name is 255 octets or eight-bit characters, and that the maximum length of each label is 63 octets. The rules may further specify that each label can only contain alphanumeric characters and hyphens ("-"), and that a label has to start with a letter but end with a letter or a numerical digit. The rules may specify that no other symbols, punctuation, or white space (i.e., spaces) be permitted.

A naming rule may further specify characteristics of domain names, such as various counts. A rule may specify, for instance, that the number of characters within a domain name that are not letters, digits, or hyphens be counted. A rule may specify that the number of empty labels (i.e., in which two dots are adjacent to one another) within the domain name be counted. A rule may specify that the number of labels with invalid characters be counted. A rule may specify that the number of labels starting with an invalid character be counted. A rule may specify that the number of labels beginning with a letter be counted. A rule may specify that the number of labels not ending in a letter or a numerical digit be counted.

Irrespective of the naming rules, however, a legitimate domain name—i.e., a domain name that will resolve to a networking address and thus a domain name by which a domain (be it benign or malicious) can be accessed—may nevertheless deviate from and thus not confirm to these rules. Different web browser software, for instance, permit underscores ("_") in domain names. The overall length limit may not be enforced, and/or the length limit of each label may not be enforced. In this respect, it is noted that deviation from a rule corresponding to a domain name characteristic, such as a particular count as noted above, is the characteristic itself. That is, a particular count as specified by a rule is considered herein under the rubric as the deviation from the rule.

For a given set of domain name naming rules, therefore, it can be said that there are a number of deviation types, which may each correspond to a different naming rule. When a particular naming rule has been deviated from in a domain name, the domain name can thus be said to have a deviation for the deviation type corresponding to this rule. As such, a domain name can deviate from a set of domain name naming rules in accordance with a number of different types of deviations. For each different type of deviation, a domain name can deviate one or more times. As an example, if a domain name includes five labels, and four of the labels begin with a number, then the domain name has four deviations for the deviation type corresponding to the naming rule that labels have to start with letters. For a deviation type corresponding to a characteristic-oriented naming rule, the number of deviations therefrom is the corresponding characteristic. For example, for a naming rule specifying the number of labels beginning with a letter, the number of deviations for a deviation type corresponding to this naming rule is the count of this number of labels within a domain name.

For each different type of deviation from the domain name naming rules, the computing device determines the number of deviations within the presented domain name (102). The computing device then considers those deviation types for which the domain name has one or more deviations. That is, the computing device considers each deviation type for which there is a corresponding non-zero (i.e., greater than zero) number of deviations within the domain name.

Specifically, for each naming deviation type for which the domain name has at least one corresponding deviation, the computing device determines an extent to which the naming deviation type is indicative of a domain that is benign and an extent to which the naming deviation type is indicative of a domain that is malicious (104). As an example, there may be a list of domain names of known malicious domains, and a list of domain names of known benign domains. Each of these domain names may itself be analyzed to determine the number and types of deviations from the prescribed set of domain name naming rules. The presented domain name can then be compared to these domain names of known benign and malicious domains in this respect. That is, the computing device determines the extent to which each naming deviation type for which the presented domain name has one or more deviation indicates that the corresponding domain is benign, and the extent to which each such naming deviation type indicates that the corresponding domain is malicious. This determination is based on the presence (and the number) of deviations of the deviation type in question within domain names of known malicious domains and within domain names of known benign domains.

The computing device can then determine whether the domain to which the presented domain name corresponds is benign or malicious (106). The computing device can make this determination based on the number of deviations for each naming deviation type within the domain's domain name, as well as based on the results of the analysis of part 104. That is, the computing device makes this determination (also) based on, for each naming deviation type for which the number of deviations within the domain name is non-zero, the extent to which the naming deviation type in question is indicative of the domain being benign, and the extent to which this naming deviation type is indicative of the domain being malicious, as assessed in part 104.

FIGS. 2A and 2B show an example method 200 for determining whether a domain is benign or malicious based on its domain name. The method 200 is consistent with but more detailed than the method 100 of FIG. 1. A computing device can also perform the method 200, as in the method 100. Also like the method 100, the method 200 may be implemented as program code stored on a non-transitory computer-readable data storage medium and executable by a computing device.

The computing device receives a domain name of a domain (202). The computing device may receive the domain name from a client computing device to which the computing device is communicatively connected over a network. As noted above, in one example implementation, the client may be a desktop or laptop computer that accesses the Internet or another network via or through the computing device, which may be a server providing routing or DNS functionality, or may be networking equipment like a dedicated or special-purpose router, and so on. In this implementation, then, the client provides the domain name to the computing device performing the method 200, and the device determines and can control whether the client is permitted to access the domain having the provided domain name.

More generally, the computing device may receive one or more domain names. For each domain name, in another example implementation as also noted above, the computing device can determine whether the associated domain is benign or malicious, and correspondingly configure networking equipment—including the computing device itself—to control subsequent access to each domain based on whether it has been determined as benign or malicious. As such, benign and malicious domains are determined ahead of time in this implementation, prior to access thereto being requested by clients, so that device configuration can accordingly occur to control subsequent domain access.

For example, the computing device may generate a "white list" of benign domains to which access is permitted. The computing device may also or instead generate a "black list" of malicious domains to which access is not permitted. In the latter case, for instance, domains having domain names that are not on the black list are presumed to be benign to the extent that access is permitted.

In another implementation, the computing device performing the method 100 may itself be the client computing device running the web browsing software, app, or other software that is attempting to access the domain having the received domain name. In this case, the client determines whether the software running on the same device should be permitted to access to the domain. If the domain is determined as benign based on its domain name, then access is permitted, and if the domain is determined as malicious based on its domain name, then access is not permitted.

The domain name received in part 202 is associated with a domain. The method 200 does not determine whether the domain name is a legitimate domain name in that the method 200 does not determine whether the domain name is associated with an actual domain. Rather, the method 200 presumes to at least some degree that the domain name is associated with an actual domain (i.e., that the domain name is a legitimate domain name), and instead determines whether, based on the presented domain name, whether such a domain is likely to be benign or malicious.

For each type of naming deviation of a number of different such types of naming deviations from prescribed domain name naming rules, the computing device determines the number of such deviations the received domain name has (204). Part 204 can implement part 104 of the method 100. In one implementation, the computing device generates a row vector having values for a number of columns. The row vector corresponds to the domain name. Each column corresponds to a different naming deviation type from the prescribed domain name naming rules. The value the row vector has in each column is equal to the number of deviations within the domain name of the naming deviation type to which the column corresponds.

The row vector may be mathematically expressed as $X_i$, where i denotes domain name i (i.e., the domain name received in part 202). There may be j different naming deviation types, such that the row vector has values for j columns. The mathematical expression $X_i^j$ represents the value the row vector for domain name i has for column j.

As noted above, for a given naming deviation type, there can be multiple deviations within a given domain name. Certain domain name naming rules may be applied on a per-label basis, where the domain name has a number of labels separated by dots as has been described. An example of such a naming rule is that each label can have a maximum length in octets, or characters. A domain name can therefore have multiple deviations for each such naming deviation type, with a maximum number equal to the number of labels within the domain name.

Other domain name naming rules may be applied on a per-domain name basis. An example of such a naming rule is that the domain name as a whole can have a maximum length in octets, or characters (regardless of the length of each label of the domain name). A domain name can therefore have at most one deviation for each such naming deviation type.

Still other domain name naming rules may be applied on a per-domain name character basis. An example of such a naming rule is that certain characters are impermissible with the domain name. In one implementation, there may be one such naming rule covering all such impermissible characters, whereas in another implementation, there may be a naming rule for each impermissible character. A domain name can therefore theoretically have at most a number of deviations for each such naming deviation type equal to the length of the domain name in characters.

The column values of the row vector for the domain name may be normalized. For instance, each column value may be normalized based on the particular domain name under analysis, taking into account the naming deviation type to which the column in question corresponds. For example, for a naming deviation type corresponding to deviation from a naming rule that is applied on a per-label basis, the column value can be normalized based on the number of labels that the domain name has. Such a column value may be normalized by simply dividing the domain name's number of deviations for the corresponding naming deviation type by the number of labels within the domain name.

As another example, for a naming deviation type corresponding to deviation from a naming rule that is applied on a per-domain name basis, the column value may be considered as intrinsically normalized, since the maximum value is already one. As a third example, for a naming deviation type corresponding to a deviation from a naming rule that is applied on a per-domain name character basis, the column volume can be normalized based on the number of characters that the domain name has. Such a column value may be normalized by simply dividing the domain name's number of deviations for the corresponding naming deviation type by the number of characters within the domain name.

For each naming deviation type for which the number of deviations within the domain name is non-zero (i.e., greater than zero), the computing device estimates the probability that a benign domain will have the naming deviation type (206). This probability is also referred to herein as a first benign probability, and can be mathematically expressed as $P(X_i^j|B)$, which is the probability that if a domain i is benign, then the corresponding row vector $X_i$ for this domain's domain name will have the column value $X_i^j$ for the deviation type j. That is, the first benign probability is the probability that any benign domain will have a number of deviations equal to $X_i^j$ in the row vector $X_i$ for its domain name.

The first benign probability for a naming deviation type can be estimated from the domain names of known benign domains and the domain names of known malicious domains. For example, for a given set of domains that have been accessed within a computing system including the computing device performing the method 200 and a number of clients including the client from which the domain name under analysis may have been received in part 202, each such domain may be considered benign if it was not deemed to be malicious. In this respect, a list of known malicious domains may be received from an archive of such malicious domains that are publicly and otherwise available, and any domain not that has been accessed within the computing system that is not on the list of known malicious domains may be considered a benign domain.

Therefore, the (normalized) number of deviations within the domain name of each known benign domain for the naming deviation type in question is determined, such as in the same process that has been described in relation to the domain name under analysis in part 204. The first benign probability for this naming deviation type is then estimated based on these numbers of deviations. As an example, the normalized number of deviations within the domain names of the known benign domains may be averaged to estimate the first benign probability. As another example, such an average normalized number of deviations within the domain names of the known benign domains may be multiplied by the column value $X_i^j$ of the row vector for the domain name under analysis to estimate the first benign probability. The latter example explicitly considers the actual (normalized) number of deviations within the domain name under analysis, whereas the former example may not.

The process that has been described is repeated to determine the first benign probability for each naming deviation type for which the domain name under analysis has a non-zero number of deviations. That is, this process is repeated to determine the first benign probability for each column that the row vector corresponding to the domain name has a non-zero value. Each first benign probability is thus estimated from the presence of a corresponding naming deviation type within domain names of known benign domains. That is, each first benign probability is estimated from the (normalized) numbers of deviations of the corresponding naming deviation type within the domain names of known benign domains.

For each naming deviation type for which the number of deviations within the domain name under analysis is non-zero (i.e., greater than zero), the computing device also similarly estimates the probability that a malicious domain will have the naming deviation type (208). This probability is also referred to herein as a first malicious probability, and can be mathematically expressed as $P(X_i^j|M)$, which is the probability that if a domain i is malicious, then the corresponding row vector $X_i$ for the domain's domain name will have the column value $X_i^j$ for the deviation type j. That is, the first malicious probability is the probability that any malicious domain will have a number of deviations equal to $X_i^j$ the row vector $X_i$ for its domain name.

The first malicious probability for a naming deviation type can be estimated from the domain names of known malicious domains and the domain names of known benign domains. For example, as noted above, a list of known malicious domains may be received from an archive of such malicious domains that are publicly and otherwise available. Such a list of known malicious domains may be generated using domain generation algorithms (DGAs) known to be commonly used by malware developers.

Therefore, the (normalized) number of deviations within the domain name of each known malicious domain for the naming deviation type in question is determined, such as in the same process that has been described in relation to the domain name under analysis in part 204. The first malicious probability for this naming deviation type is then estimated based on these numbers of deviations. As an example, the normalized number of deviations within the domain names of the known malicious domains may be averaged to estimate the first malicious probability. As another example, such an average normalized number of deviations may be multiplied by the column value $X_i^j$ of the row vector for the domain name under analysis to estimate the first malicious probability. The latter example explicitly considers the actual (normalized) number of deviations within the domain name under analysis, whereas the former example may not.

The process that has been described is again repeated to determine the first malicious probability for each naming deviation type for which the domain name under analysis has a non-zero number of deviations. That is, this process is repeated to determine the first malicious probability for each column that the row vector corresponding to the domain name has a non-zero value. Each first malicious probability is thus estimated from the presence of a corresponding naming deviation type within domain names of known malicious domains. That is, each first malicious probability is estimated form the (normalized) numbers of deviations of the corresponding naming deviation type within the domain names of known malicious domains.

The computing device estimates the probability that any given domain of a set of domains is benign (210). This probability is also referred to as a second benign probability, and can be mathematically expressed as P(B). It is noted that whereas there can be multiple first benign probabilities, since a first benign probability is estimated for each column for which the row vector of the domain name under analysis has a non-zero value, there is just one second benign probability.

That any given domain of a set of domains is benign can be estimated in a number of different ways. As one example, historical third-party estimations of the number of benign domains on the Internet and the number of malicious domains on the Internet can be used to estimate the second benign probability, as the estimated number of benign domains divided by the estimated total number of domains. As a second example, for a computing system including the computing device performing the method 200 and a number of clients including the client from the domain name under analysis may have been received in part 202, the second benign probability can be estimated as the number of benign domains accessed by such clients, divided by the total number of domains (be they benign or malicious) that the clients have accessed.

The computing device similarly estimates the probability that any given domain of the set of domains is malicious (212). This probability is also referred to as a second malicious probability, and can be mathematically expressed as P(M). As with the benign probabilities, it is noted that whereas there can be multiple first malicious probabilities, since a first malicious probability is estimated for each column for which the row vector of the domain name under analysis has a non-zero value, there is just one second malicious probability.

That any given domain of a set of domains is benign can also be estimated in a number of different ways. As one example, historical third-party estimations of the number of benign domains on the Internet and the number of malicious domains on the Internet can be used to estimate the second malicious probability, as the estimated number of malicious domains divided by the estimated total number of domains. As a second example, for a computing system including the computing device performing the method 200 and a number of clients including the client from the domain name under analysis may have been received in part 202, the second malicious probability can be estimated as the number of malicious domains accessed by such clients, divided by the total number of domains (be they benign or malicious) that the clients have accessed.

The computing device determines the probability that the domain having the domain name under analysis is benign (214). This probability can be mathematically expressed as $P(B|X_i)$, which is the probability that the domain having the domain name represented by the row vector $X_i$ is benign. Per conditional probability theory, this probability is proportional to (and can be equal to) $P(X_i|B)P(B)$. Assuming conditional independence among deviations of different naming deviation types, then, $$P(B|X_i) \propto \Pi_j P(X_i^j|B)P(B).$$

As such, the probability that the domain having the domain name in question is benign is proportional to (and can be equal to) the multiplicative product of the first benign probability that has been estimated for each naming deviation type for which the domain name has at least one deviation, multiplied by the second benign probability. Stated another way, the probability that the domain having the domain name is benign is proportional to (and can be equal to) the multiplicative product of the estimated first benign probabilities and the estimated second benign probability. More generally, the probability that the domain in question is benign is based on each first benign probability that has been estimated as well as on the second benign probability that has been estimated.

The computing device similarly determines the probability that the domain having the domain name under analysis is malicious (214). This probability can be mathematically expressed as $P(M|X_i)$ which is the probability that the domain having the domain name represented by the row vector $X_i$ is benign. Per conditional probability theory, this probability is proportional to (and can be equal to) $P(X_i|M)P(M)$. Assuming conditional independence among deviations of different naming deviation types, $$P(M|X_i) \propto \Pi_j P(X_i^j|M)P(M).$$

As such, the probability that the domain having the domain name in question is malicious is similarly proportional to (and can be equal to) the multiplicative product of the first malicious probability that has been estimated for each naming deviation type for which the domain name has at least one deviation, multiplied by the second malicious probability. Stated another way, the probability that the domain having the domain name is malicious is proportional to (and can be equal to) the multiplicative product of the estimated first malicious probabilities and the estimated second malicious probability. More generally, the probability that the domain in question is malicious is based on each first malicious probability that has been estimated as well as on the second malicious probability that has been estimated.

The computing device determines whether the domain having the domain name under analysis is benign or malicious based on the estimated probability that the domain is benign and based on the estimated probability that the domain is malicious (218). The computing device can determine whether the domain is benign or malicious based on the probabilities estimated in parts 214 and 216 in a number of different ways. As one example, the probability that the domain is malicious can be subtracted from the probability that the domain is benign, and compared to a threshold such as zero. If the resulting difference is greater than the threshold, then the domain is deemed benign, and if it is less than the threshold, then the domain is deemed malicious.

As a second example, the probability that the domain is benign and the probability that the domain is malicious may each be classified into different confidence levels. For instance, there may be three confidence levels: a high confidence level corresponding to a probability greater than a high threshold; a low confidence level corresponding to a probability lower than a low threshold; and an indeterminate confidence level corresponding to a probability between the low and high thresholds. A domain may be deemed as malicious if the estimated probability that the domain is malicious falls within the high confidence level and the estimated probability that the domain is benign falls within the indeterminate or low confidence level. A domain may be deemed as benign if the estimated probability that the domain is benign is benign falls within the high confidence level and the estimated probability that the domain is malicious falls within the indeterminate or low confidence level. In this example, a domain may not be deemed as either benign or malicious (and thus indeterminate) outside of these two cases.

As a third example, if it may be determined that for each domain of a large number of domains the probability that the domain is benign is close to (i.e., within a threshold of in value) the probability that the domain is malicious. In this case, it may then be concluded that the method 200 is no longer able to sufficiently determine whether a domain is benign or malicious. Therefore, new data—i.e., domain names of additional known benign and/or malicious domains—may have to be acquired, so that the method 200 can once again distinguish a benign domain from a malicious domain.

In any case, in the specific implementation depicted in FIGS. 2A and 2B, if the computing device has determined that the domain having the domain name in question is benign (220), then access to the domain is permitted (222), and if the device has determined that the domain is malicious (220), then access to the domain is blocked (224). As an example, in the implementation in which the computing device performing the method 200 receives the domain name from a client, such as to resolve the domain name into the network address of the domain associated with the domain name, the computing device may permit the client to access the domain in part 222 and prevent the client from accessing the domain in part 224. If the computing device is a routing device through which communication from the client to an outside network, like the Internet, at which the domain is accessible, the computing device can thus correspondingly allow or block such access.

Other actions may also be performed in part 224 when the domain is deemed to be malicious. A client may be redirected to another computing device, so as to alert the user of the client. The client may be placed into quarantine. An alert may also be generated and sent to the security system of the organization of which the user of the client is a part. A record of why the domain has been deemed malicious based on its domain name may also be recorded—that is, the information determined in parts 204, 206, 208, 210, 212, 214, 216, and/or 218 may be recorded—for subsequent analysis.

As another example of parts 222 and 224, in the implementation in which the computing device performing the method 200 receives the domain name to generate a "white" list of benign domains or a "black" list of malicious domains, the device may correspondingly configure a networking device, which may be the computing device itself, so that subsequent access to the associated domain is permitted (when part 222 is performed) or denied (when part 224 is performed). Therefore, when a client attempts to access the domain, the networking device will have already been configured to permit or block such access. As a third example, in the implementation in which the computing device performing the method 200 is such a client itself, the client may permit software like an app or web browser software running on the client to access the associated domain (when part 222 is performed) or not (when part 224 is performed). For instance, such configuration may occur at the operating system level, through which external network communication initiated at application software like apps and web browser software occurs.

The computing device may further update the known benign and/or malicious domains within the set of all domains (226). As one example, in response to determining that the domain associated with the domain name that has been analyzed is benign, the computing device may update the known benign domains to include this domain. Similarly, in response to determining that the domain associated with the domain name in question is malicious, the computing device may update the known malicious domains to include this domain.

As another example, the computing device may periodically update the known benign domains and/or the known malicious domains by receiving or otherwise generating identification of such domains. For instance, if a new DGA becomes available, the computing device may generate new malicious domains, or receive such new malicious lists as generated by a different device. The computing device may also receive new benign domains that were accessed within the computing system of which the computing device is a part.

FIG. 3 shows an example non-transitory computer-readable data storage medium 300. The computer-readable data storage medium 300 stores program code 302 that is executable by a computing device, such as the computing device that has been described as performing the methods 100 and 200 of FIGS. 1, 2A, and 2B. The program code 302 is executable by the computing device to perform processing.

The processing includes determining a number of deviations for each of a number of naming deviation types within a domain name of a domain (304). Each naming deviation type is a different type of deviation from domain name naming rules. Part 304 can be performed as has been described above in relation to parts 102 and 204 of FIGS. 1, 2A, and 2B.

The processing include estimating, for each naming deviation type for which the number of deviations within the domain name is non-zero, a first benign probability that the domain name of a benign domain will have the naming deviation type and a first malicious probability that the domain name of a malicious domain will have the naming deviation type (306). Part 306 can determine each first benign probability as has been described in relation to part 206 of FIG. 2A. Part 306 can determine each first malicious probability as has been described in relation to part 208 of FIG. 2A.

The processing includes estimating a second benign probability that any given domain is benign and a second malicious probability that any given domain is malicious (308). Part 308 can determine the second benign probability as has been described in relation to part 210 of FIG. 2. Part 308 can determine the second malicious probability as has been described in relation to part 212 of FIG. 2A.

The processing includes estimating a probability that the domain is benign and a probability that the domain is malicious, based on the first benign and malicious probabilities of each naming deviation type for which the number of deviations within the domain name is non-zero, and based on the second benign and malicious probabilities (310). Part 310 can determine the probability that the domain is benign as has been described in relation to part 214 of FIG. 2A. Part 310 can determine the probability that the domain is malicious as has been described in relation to part 216 of FIG. 2B.

The processing includes determining whether the domain is benign or malicious based on the probability that the domain is benign and based on the probability that the domain is malicious (312). Part 312 can determine whether the domain is benign or malicious as has been described in relation to part 218 of FIG. 2B. The processing includes performing an action, based on whether the domain is determined as benign or malicious (314). Such an action can include permitting or blocking a client from accessing the domain, and/or configuring a networking device to permit or deny subsequent access to the domain, as has been described in relation to parts 222 and 224 of FIG. 2B.

FIG. 4 shows an example computing system 400. The computing system 400 can be or include the computing device that has been described as performing the methods 100 and 200 of FIGS. 1, 2A, and 2B. The computing system 400 includes a processor 402 and a non-transitory computer-readable data storage medium 404 storing program code 405 that is executable by the processor 402.

The processor 402 executes the program code 405 to generate a row vector for a domain name of a domain (406). The row vector includes columns corresponding to naming deviation types. Each naming deviation type is a different type of deviation from domain name naming rules. For each column the row vector has a value indicating a number of deviations within the domain name of the naming deviation type to which the column corresponds. Part 406 can be performed as has been described in relation to part 204 of FIG. 2A.

The processor 402 executes the program code 405 to estimate, for each column having a non-zero value, a first benign probability and a first malicious probability (408). The first benign probability for a column is the probability that benign domains have the naming deviation type to which the column corresponds. The first malicious probability for a column is the probability that malicious domains have the naming deviation type to which the column corresponds. Part 408 can be performed as has been described in relation to parts 206 and 208 of FIG. 2A.

The processor 402 executes the program code 405 to estimate a second benign probability and a second malicious probability (410). The second benign probability is the probability that any given domain is benign. The second malicious probability is the probability that any given domain is malicious. Part 410 can be performed as has been described in relation to parts 210 and 212 of FIG. 2A.

The processor 402 executes the program code 405 to estimate a probability that the domain is benign and a probability that the domain is malicious (412). The probability that the domain is benign is determined based on the first benign probability for each column having a non-zero value and based on the second benign probability, such as has been described in relation to part 214 of FIG. 2A. The probability that the domain is malicious is determined based on the first malicious probability for each column having a non-zero value and based on the second malicious probability, such as has been described above in relation to part 216 of FIG. 2B.

The processor 402 executes the program code 405 to determine whether the domain is benign or malicious (414), based on the probability that the domain is benign and based on the probability that the domain is malicious, such as has been described in relation to part 218 of FIG. 2B. The processor 402 executes the program code 405 to, in response to determining that the domain is benign, permit access to the domain (416), such as has been described in relation to part 222 of FIG. 2B. The processor 402 executes the program code 405 to, in response to determining that the domain is malicious, block access to the domain (418), such as has been described in relation to part 224 of FIG. 2B.

The techniques that have been described above leverage the novel insight that benign domains have domain names that deviate from prescribed domain name naming rules in ways different than the domain names of malicious domains do. In this respect, the techniques further leverage the fact that domain name naming rules are not absolutely enforced when, for instance, resolving a domain name to a networking address of a domain. The techniques thus provide for a novel manner by which to determine whether a domain is benign or malicious, and therefore can improve security by correspondingly permitting or preventing access to such a domain.

We claim:

1. A computing system comprising:
   a processor;
   a non-transitory computer-readable data storage medium storing program code executable by the processor to:
   receive a first domain name of a first domain that a client computing device is attempting to access;
   determine a number of naming deviations that the first domain name has from domain-name naming rules, wherein the domain-name naming rules are specific rules for creating domain names, and wherein the number of naming deviations that the first domain name has is a number of times the first domain name deviates from the domain-name naming rules;
   determine a first benign probability that a known benign domain in a list of known benign domains has a same number of naming deviations as the first domain name;
   determine a first malicious probability that a known malicious domain in a list of known malicious domains has the same number of naming deviations as the first domain name;
   determine a probability that the first domain is benign based on the first benign probability and the number of naming deviations that the first domain name has;
   determine a probability that the first domain is malicious based on the first malicious probability and the number of naming deviations that the first domain name has;
   determine whether the first domain that the client computing device is attempting to access is benign or malicious based on a comparison between the probability that the first domain is benign and the probability that the first domain is malicious; and
   in response to a determination that the first domain is malicious, prevent the client computing device from accessing the first domain.

2. The computing system of claim 1, wherein the program code is further executable by the processor to:
   in response to a determination that the first domain is benign, permit the client computing device to access the first domain.

3. The computing system of claim 1, wherein the program code is further executable by the processor to:
   in response to the determination that the first domain is malicious, block access to the first domain and configure network hardware of the computing system to deny subsequent requests to access the first domain; and
   in response to a determination that the first domain is benign, permit the client computing device to access the first domain and configure the computing system to grant the subsequent requests to access the first domain.

4. The computing system of claim 1, wherein to determine the first benign probability and to determine the first malicious probability, the program code causes the processor to:
   determine the first benign probability from presence of the naming deviations in the list of known benign domains; and
   determine the first malicious probability from presence of the naming deviation in the list of known malicious domain.

5. The computing system of claim 1, wherein to determine the probability that the first domain is benign and to determine the probability that the first domain is malicious, the program code causes the processor to:
   determine a second benign probability that any given domain of a plurality of domains is benign based on historical data of the known benign domains;
   determine a second malicious probability that any given domain of the plurality of domains is malicious based on historical data of the known malicious domains;
   determine the probability that the first domain is benign based on a multiplicative product of the first benign probability and the second benign probability; and
   determine the probability that the first domain is malicious based on a multiplicative product of the first malicious probability and the second malicious probability.

6. The computing system of claim 1, wherein the program code causes the processor to:
   in response to the determination that the first domain is malicious, update the list of known malicious domains to include the first domain; and
   in response to a determination that the first domain is benign, update the list of known benign domains to include the first domain.

7. The computing system of claim 1, wherein the program code causes the processor to:
   periodically update the list of known benign domains and the list of known malicious domains.

8. A non-transitory computer-readable data storage medium storing program code that when executed by a computing device cause the computing device to:
   receive a first domain name of a first domain that a client device is attempting to access;
   determine a number of naming deviations that the first domain name has based on domain-name naming rules, wherein the domain-name naming rules are specific rules for creating domain names, and wherein the number of naming deviations that the first domain name has is a number of times the first domain name deviates from the domain-name naming rules;
   determine a first benign probability that a known benign domain in a list of known benign domains has a same number of naming deviations as the first domain name;
   determine a first malicious probability that a known malicious domain in a list of known malicious domains has the same number of naming deviations as the first domain name;

determine a probability that the first domain is benign based on the first benign probability and the number of naming deviations that the first domain name has;

determine a probability that the first domain is malicious based on the first malicious probability and the number of naming deviations that the first domain name has;

determine whether the first domain that the client device is attempting to access is benign or malicious based on a comparison between the probability that the first domain is benign and the probability that the first domain is malicious; and in response to a determination that the first domain is malicious, prevent the client device from accessing the first domain.

9. The non-transitory computer-readable data storage medium of claim 8, wherein the program code causes the computing device to:

in response to a determination that the first domain is benign, permit the client device to access the first domain.

10. The non-transitory computer-readable data storage medium of claim 8, wherein the program code causes the computing device to:

in response to the determination that the first domain is malicious, configure the computing device to deny subsequent requests to access the first domain; and in response to a determination that the first domain is benign, configure the computing device to grant the subsequent requests to access the first domain.

11. The non-transitory computer-readable data storage medium of claim 8, wherein to determine the first benign probability and to determine the first malicious probability, the program code causes the computing device to:

determine the first benign probability from presence of the naming deviation in the list of known benign domains; and determine the first malicious probability from presence of the naming deviations in the list of known malicious domains.

12. The non-transitory computer-readable data storage medium of claim 11, wherein to determine the probability that the first domain is benign and the probability that the first domain is malicious, the program code causes the computing device to:

determine a second benign probability that any given domain of a plurality of domains is benign based on historical data of the known benign domains;

determine a second malicious probability that any given domain of the plurality of domains is malicious based on historical data of the known malicious domains;

determine the probability that the first domain is benign based on a multiplicative product of the first benign probability and the second benign probability; and determine the probability that the first domain is malicious based on a multiplicative product of the first malicious probability and the second malicious probability.

13. The non-transitory computer-readable data storage medium of claim 11, wherein the program code causes the computing device to:

in response to a determination that the first domain is malicious, update the list of known malicious domains to include the first domain; and in response to a determination that the first domain is benign, update the list of known benign domains to include the first domain.

14. The non-transitory computer-readable data storage medium of claim 11, wherein the program code causes the computing device to:

periodically update the list of known benign domains and the list of known malicious domains.

15. A method comprising:

receiving, by a computing device, a first domain name of a first domain that a client device is attempting to access;

determining, by the computing device, a number of naming deviations that the first domain name has from domain-name naming rules, wherein the domain-name naming rules are specific rules for creating domain names, and wherein the number of naming deviations that the first domain name has is a number of times the first domain name deviates from the domain-name naming rule;

determining, by the computing device, a first benign probability that a known benign domain in a list of known benign domains has a same number of naming deviations as the first domain name;

determining, by the computing device, a first malicious probability that a known malicious domain in a list of known malicious domains has the same number of naming deviations as the first domain name;

determining, by the computing device, a probability that the first domain is benign based on the first benign probability and the number of naming deviations that the first domain name has;

determining, by the computing device, a probability that the first domain is malicious based on the first malicious probability and the number of naming deviations that the first domain name has;

determining, by the computing device, whether the first domain that the client device is attempting to access is benign or malicious based on a comparison between the probability that the first domain is benign and the probability that the first domain is malicious; and in response to a determination that the first domain is malicious, preventing, by the computing device, the client device from accessing the first domain.

16. The method of claim 15, further comprising:

in response to a determination that the first domain is benign, permitting, by the computing device, the client device to access the first domain.

17. The method of claim 15, further comprising:

in response to the determination that the first domain is malicious, configuring, by the computing device, the computing device to deny subsequent requests to access the first domain; and in response to a determination that the first domain is benign, configuring, by the computing device, the computing device to grant the subsequent requests to access the first domain.

18. The method of claim 15, further comprising:

determining, by the computing device, a second benign probability that any given domain of a plurality of domains is benign based on historical data of the known benign domains; and determining, by the computing device, a second malicious probability that any given domain of the plurality of domains is malicious based on historical data of the known malicious domains.

19. The method of claim 18, wherein the determination of the probability that the first domain is benign is based on a multiplicative product of the first benign probability and the second benign probability, and wherein the determination of the probability that the first domain is malicious is based on a multiplicative product of the first malicious probability and the second benign probability.

20. The method of claim 19, wherein determining the first benign probability comprises: determining the first benign probability from presence of the naming deviations in the list of known benign domains; and wherein determining the first malicious probability comprises: determining the first malicious probability from presence of the naming deviations in the list of known malicious domains.

\* \* \* \* \*